United States Patent [19]

KUNTZ

[11] 4,040,791

[45] Aug. 9, 1977

[54] SPECIMEN COLLECTING DEVICE

[75] Inventor: David H. Kuntz, 6027 Halm St., Los Angeles, Calif. 90056

[22] Filed: June 22, 1976

[21] Appl. No.: 698,707

[52] U.S. Cl. ....................... 23/259; 23/292; 73/421 R; 128/2 F; 128/295

[51] Int. Cl.² ........................ G01N 33/16; G01N 1/10; A61B 10/00

[58] Field of Search ....................... 23/259, 230 B, 292; 73/421 R, 444; 128/2 F, 295

[56] References Cited

UNITED STATES PATENTS

| | | | |
|---|---|---|---|
| 3,499,327 | 3/1970 | Lane, Jr | 73/421 R |
| 3,635,091 | 1/1972 | Linzer et al. | 73/421 R |
| 3,830,107 | 8/1974 | Linzer et al. | 73/421 R |
| 3,894,845 | 7/1975 | McDonald | 23/259 X |
| 3,929,412 | 12/1975 | Villari | 23/259 |

*Primary Examiner*—R. E. Serwin
*Attorney, Agent or Firm*—Henry M. Bissell

[57] ABSTRACT

A device for collecting a urine specimen, particularly adapted for females. The device includes an integral compartmented unit with intercommunication ports, overflow and run-off channels, and means for attachment and direction of a collected specimen to a specimen container. The device is configured and adapted for use while the patient is sitting on a toilet in the normal position for voiding. The device has a funnel-shaped collector which directs the urine into a first chamber which is provided with a leak hole at the bottom which permits urine to escape from the first chamber at a limited rate. A second chamber communicating with the specimen container has a first opening communicating with the first chamber at a predetermined level above the leak hole outlet thereof. A run-off channel communicates with the first chamber via an overflow channel above the level of the first communicating opening. An overflow port extends from the specimen container to the run-off channel. In a second embodiment, two run-off channels are provided, one for overflow from the first chamber and a separate one for overflow from the specimen container.

21 Claims, 7 Drawings

SPECIMEN COLLECTING DEVICE

BACKGROUND OF THE INVENTION

A device for collecting a urine specimen, particularly adapted for females. The device includes an integral compartmented unit with intercommunication ports, overflow and run-off channels, and means for attachment and direction of a collected specimen to a specimen container. The device is configured and adapted for use while the patient is sitting on a toilet in the normal position for voiding. The device has a funnel-shaped collector which directs the urine into a first chamber which is provided with a leak hole at the bottom which permits urine to escape from the first chamber at a limited rate. A second chamber communicating with the specimen container has a first opening communicating with the first chamber at a predetermined level above the leak hole outlet thereof. A run-off channel communicates with the first chamber via an overflow channel above the level of the first communicating opening. An overflow port extends from the specimen container to the run-off channel. In a second embodiment, two run-off channels are provided, one for overflow from the first chamber and a separate one for overflow from the specimen container.

Field of the Invention

This invention relates to the field of portable urine specimen collecting devices and, more particularly, to such devices directed for use with female patients.

Description of the Prior Art

Urine analysis is such a simple, common and useful diagnostic aid that the taking of a urine specimen is generally included in even the simplest of physical examinations. It is important not only as an indicator or detector of certain physical conditions and diseases, but it is also particularly useful in connection with the treatment of infections related to the urinary tract, which are much more common in females. However, the problem of collecting a suitable specimen is considerably more complex when a female patient is involved.

In the collecting of a urine specimen from a female patient, it is important to take the specimen as a "midstream" or "clean catch" sample. With a female patient voiding in the normal manner, the initial portion is more likely to contain contamination from foreign matter than that portion which follows. The initial portion is expelled with less force and therefore is voided as a mere trickle which is likely to trail along the labia and pick up whatever contamination is present in those areas. The midstream portion is expelled with the greatest force and is most likely to leave the urethral meatus directly as a stream without contacting the labia, or if it does, the labia will have had more of the contamination washed off by the initial portion.

Some practitioners go to considerable lengths in an effort to obtain an uncontaminated urine sample from a female patient. With the patient in a reclining position, an attendant cleanses the area adjacent the urethral meatus with a suitable solution in an effort to wash off the contamination which is generally present in that area. Even with such precautions, however, contamination may develop in the collected urine sample to a level sufficient to give a false or misleading indication of the bacteria level in the sample. Moreover, taking a sample under such conditions is an extremely awkward and uncomfortable experience for the patient and is fairly costly, since the patient is required to be present in the physician's office or a hospital with a special attendant, usually a nurse, administering the procedure.

What is needed is some simple but effective, foolproof device, preferably disposable after a single use, which a patient can use with a minimum of instructions and without assistance, while voiding in the normal manner. It should have the capability of receiving the entire amount of voided urine, rejecting the initial portion, selecting a portion corresponding to the midstream sample and transferring it to a specimen container, and rejecting the remainder of the voided urine by directing it, together with any overflow from the specimen container, into the toilet on which the patient is positioned in the normal attitude.

SUMMARY OF THE INVENTION

In brief, particular arrangements in accordance with the present invention comprise a device, preferably molded of plastic or some other low cost material which is readily disposable after use, having a first chamber for receiving the urine as it is voided and a second chamber into which the midstream sample transfers automatically after the initial portion is diverted. The second chamber communicates with a specimen container for transfer of the midstream portion from the second chamber into the specimen container. There is a run-off channel for directing overflow from the first chamber downward and out of the device. There is also an overflow port extending from the specimen container to the run-off channel for permitting air to exit from the specimen container as it is filled with the midstream portion being transferred from the second chamber and also to accommodate any overflow of urine from the specimen container.

In a first embodiment, the device is especially configured, preferably about the major circumference of the device near the upper end thereof, with a shallow finger groove to facilitate gripping the device naturally so that it is orientated in a selected juxtaposition relative to the patient who is holding it for collecting the urine sample. The specimen container is self-contained in a well in the lower part of the device and is frictionally engaged by a projection extending into the neck of the container. The container may have a molded plastic flap extending slightly from the bottom thereof to permit ready removal of the container from the device. An associated cap, molded with a specimen container and attached near the top by a plastic hinge, may be provided for sealing the opening in the top of the specimen container after the container is removed from the device. The device is preferably made of thin plastic or other suitable material so that it may be split open if desired to facilitate removal of the specimen container therefrom, is very low in cost, and is intended for disposal after use.

A second embodiment of the present invention has its second chamber configured in a narrow, elongated shape which advantageously minimizes the turbulence of urine transferred thereto from the first chamber. The opportunity afforded any sedimentary particles which may be contained in the urine to settle to the bottom of the second chamber is enhanced. These particles thus avoid being mixed with the midstream portion of the voided urine being collected for transfer to the specimen container.

The various arrangements in accordance with the present invention are provided with leak or drain holes in all of the respective compartments and channels so that the device naturally drains itself under the force of gravity, except for the specimen which has been collected in the specimen container during use.

BRIEF DESCRIPTION OF THE DRAWINGS

A better understanding of the present invention may be had from a consideration of the following detailed description, taken in conjunction with the accompanying drawing, in which.

DESCRIPTION OF THE PREFERRED EMBODIMENT

Figure 1:
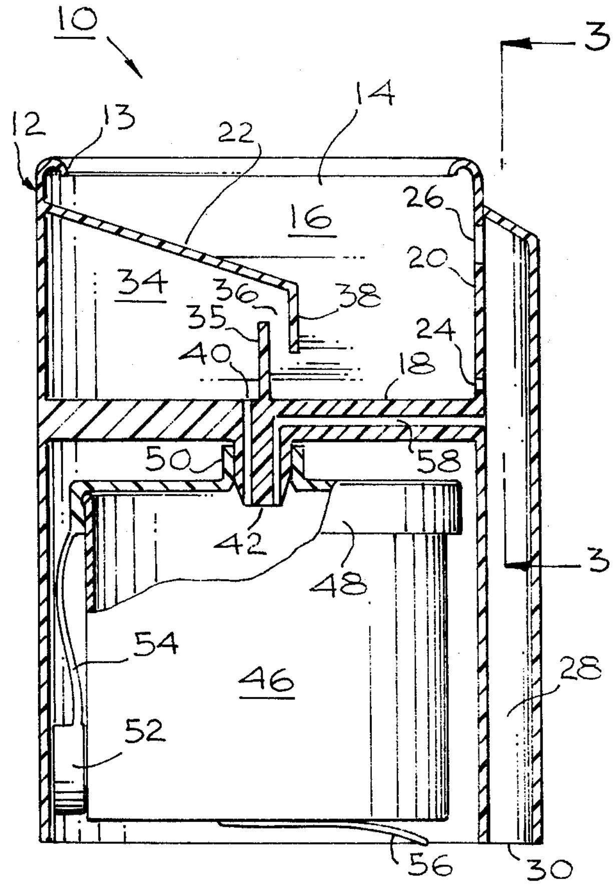
FIG. 1 is an elevational view, taken in section, of one particular arrangement in accordance with the present invention, showing a specimen container mounted in operative position therein.

In order to provide such particular arrangements, a urine collector 10 as seen in FIG. 1 is provided. Specifically, a generally rigid cylindrical wall 12 having a generally circular opening 14 is shown. The top edge of wall 12 has overhanging lip 13 turned inwardly to aid in collecting of the stream. Within the structure 12 is first receiving chamber 16. The receiving chamber 16 has a floor 18 and generally circular walls 20. An inclined floor 22 is positioned to guide, funnel or direct the urine stream toward the floor 18. The first chamber 16 is provided with a leak hole or port 24 in the wall 20. In addition, an overflow hole 26 is positioned at higher elevation along the wall 20. Both holes or ports 24, 26 open from the first chamber 16 into a run-off channel 28 through which fluid may flow to the egress port 30 generally at the bottom of the collector 10.

The collector 10 is provided with a second, transfer chamber 34 having an entrance opening 36 which is elevated above the level of the leak hole or port 24. A splash guard 38 may be provided to prevent any of the initial stream from accidental splashing through or into the chamber 34. The second chamber 34 opens to conduit 40 which extends through nipple 42.

A specimen container 46 is shown having a removable top 48. The top 48 has an opening 50 adapted to be secured around the outside of nipple 42. A cap 52 may be secured flexibly to the top 48 by a plastic ribbon 54 or the like. Thus, cap 52 may be secured to cover the opening 50 when the container is not attached to the collector 10. A flap 56 may be formed on the bottom of the container 46, in order to facilitate removal of the container from its lodgment around the nipple 42.

The generally circular wall 12 of the collector 10 extends to below the floor of container 46, so to provide rigid protection to the container 46, which may be constructed of relatively flexible material. The collector 10 should be open at its lower extremity. In such a construction, the container 46 can be inserted and removed from the nipple 42 easily. Conduit 58 connects run-off channel 28 with the interior of the container 46. The conduit 58 extends through the nipple 42 in order to achieve this purpose, thus permitting both air and excess or overflow urine to escape from the container 46 during use.

Figure 2:
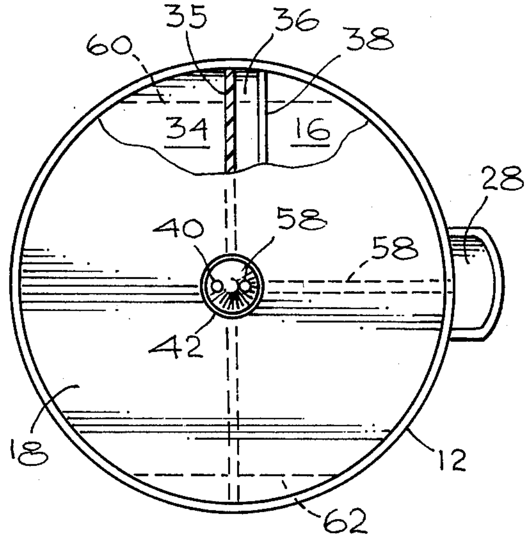
FIG. 2 is a bottom view, partially broken away, of the arrangement shown in FIG. 1 with the specimen container removed.

In FIG. 2 is shown a bottom view of the collector 10 as seen in FIG. 1, with the container 46 removed. As shown, wall 12 of the container 10 is generally circular in shape, having run-off channel 28 along the side thereof. Nipple 42 has conduits 40 and 58 opening in the bottom surface thereof. Conduit 58 connects the exterior point of nipple 42 with the run-off channel 28. The receiving chamber 16 is shown in the partial cut-away of FIG. 2. Similarly, the transfer chamber 34 can also be seen. The splash guard 38 is shown guarding and forming a part of port 36. An interior wall 35 separates the second chamber 34 from the first chamber 16, and diverts the initial portion of the urine stream from entering into the second chamber.

Bottom wall 18, common to both second chamber 35 and first chamber 16, separates the collector 10 from the container 46. A groove 60 is formed partially around the circumference of collector 10, forming an indentation of the cylindrical wall 12. The groove 60 is shaped to receive a thumb or finger of the user and, together with a similar groove 62 on the other side of the device 10, serves to help the user instinctively hold the device 10 in the proper attitude and orientation. The indentation formed by the grooves 60, 62 is further useful in gripping the collector 10 during removal therefrom of the container 46 with the collected specimen.

Figure 3:
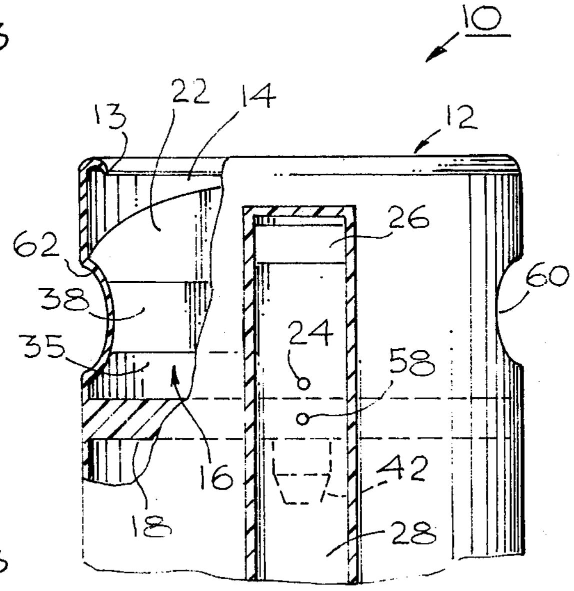
FIG. 3 is a sectional view, partially broken away, of the arrangement shown in FIG. 1, taken along the line 3—3 thereof.

In FIG. 3 of the drawings, a partially cut-away view taken along line 3—3 of FIG. 1 is shown. Opening 14 substantially forms the upper end of the collector 10. Inclined plane or guide 22 will funnel the urine stream into the lower portion of the chamber 16. Splash guard wall 38 prevents splashing of the stream into the second chamber, not seen in FIG. 3. Wall 35 forms with the splash guard 38 the port between first chamber 16 and second chamber 34. Finger grooves 60 and 62 are indented on opposite sides of the cylindrical wall 12, so that fingers of the user may securely grip the collector 10.

Leak hole 24 provides an escape from chamber 16 into the run-off channel 28. Upper port 26 allows overflow from the first chamber to enter into the run-off channel 28. Conduit 58 opens into the run-off channel 28 from the nipple 42. Floor or bottom 18 of the first chamber and also of the second chamber, separates the midstream isolating portions of the collector 10 from the container 46.

Figure 4:
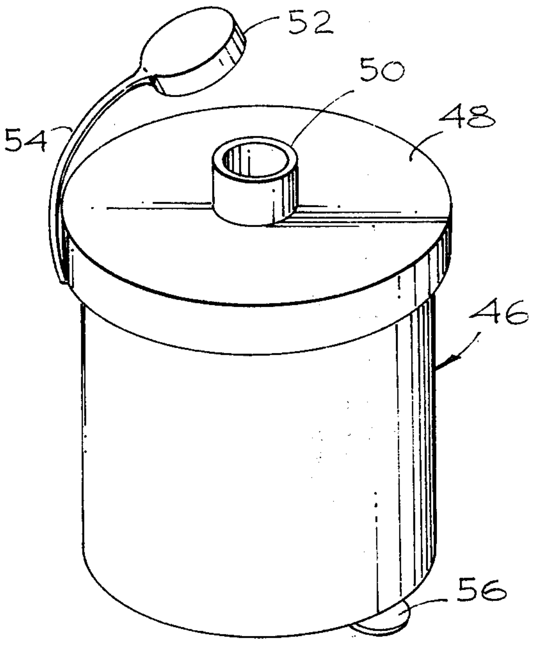
FIG. 4 is a perspective view of a specimen container adaptable for use in combination with the arrangement as shown in FIG. 1.

FIG. 4 is a perspective view of the urine specimen container 46 which may be inserted into the lower portion of collector 10. Container 46 is shown having a top 48 which may be secured to the upper end of the container 46. Cap 52 is secured to the top 48 by a strap 54 which is substantially flexible. Thus, the cap 52 may be securely placed over the opening 50 or removed from the opening 50 as desired. In such a manner, the contents of the container 46 may be secured. The opening 50 is designed, as explained above, to fit securely over the periphery of the nipple 42.

Flap 56 may be provided in order to facilitate the removal of the container 46 from placement on the nipple 42 after the sample is collected therein. The flap is preferably molded with the container 46.

In operation, the collector 10 operates in the following manner. The user grips the cylindrical wall 12 of the collector 10 by placing fingers firmly within the finger grooves 60, 62. Two adjacent fingers of the user, it will then be appreciated, securely grip the collector 10. The collector 10 is then placed so that the opening 14 can receive urine being voided by the user. The urine proceeds into the first chamber 16. Splashing of the urine is dampened by the inclined plane or bottom 22, which also serves to funnel the urine to the bottom floor 18 of the chamber 16. The initial portion of the urine stream leaks through the leak hole 24 into the run-off channel 28. After the urine has streamed for a short period of time, the liquid level in chamber 16 reaches the elevation or level of the port 36. At this time the midstream of the voiding will flow into the second chamber 34. The initial stream of the urine will continue to be leaked through the leak hole 24. Thus, the urine in first chamber 16 is now being bled from the very bottom or floor 18 of the first chamber 16 through the leak hole 24, as well as through the port 36 into the second chamber 34. The splash guard 38 serves to prevent the initial part of the stream from accidentally splashing into the second chamber 34.

Urine in second chamber 34 immediately egresses through conduit 40, through nipple 42, and into the interior of container 46. Atmospheric pressure is maintained at the normal level within container 46 by virtue of conduit 58 which connects the interior of conduit 46 to the run-off channel 28. Additionally, as the container 46 becomes filled, any overflow of the urine collected in the interior of container 46 is bled through the conduit 58 into the run-off channel 28.

If the flow rate of urine into the chamber 16 exceeds the drain rate through the leak hole 24 and the transfer port 36, the excess of the urine volume will be bled by the upper port 26 connecting the run-off channel 28 and the first chamber 16. Since the port 26 is substantially above the leak hole 24 and port 36, only excess volume of the urine stream will be bled therethrough. The run-off channel 28 opens through port 30 to the exterior of collector 10 for drainage of the collector 10.

When the user has completed voiding, the container 46 may be easily removed from within the wall 12 of the collector 10 by pulling on the flap 56. As soon as the container 46 is so removed, the opening 50 can be capped by cap 52 which is conveniently attached to the top 48 of the container 46 by strap 54, preferably molded with the top 48. The container 46 may be constructed of flexible or rigid material, as desired. The container 46 is constructed so that it may be conveniently punctured to remove the contents, if it is not desired to uncap the cap 52 from the opening 50. With the cap 52 in place, the container 46 is sealed and can be stored or transported without fear of losing the specimen collected.

Figure 5:
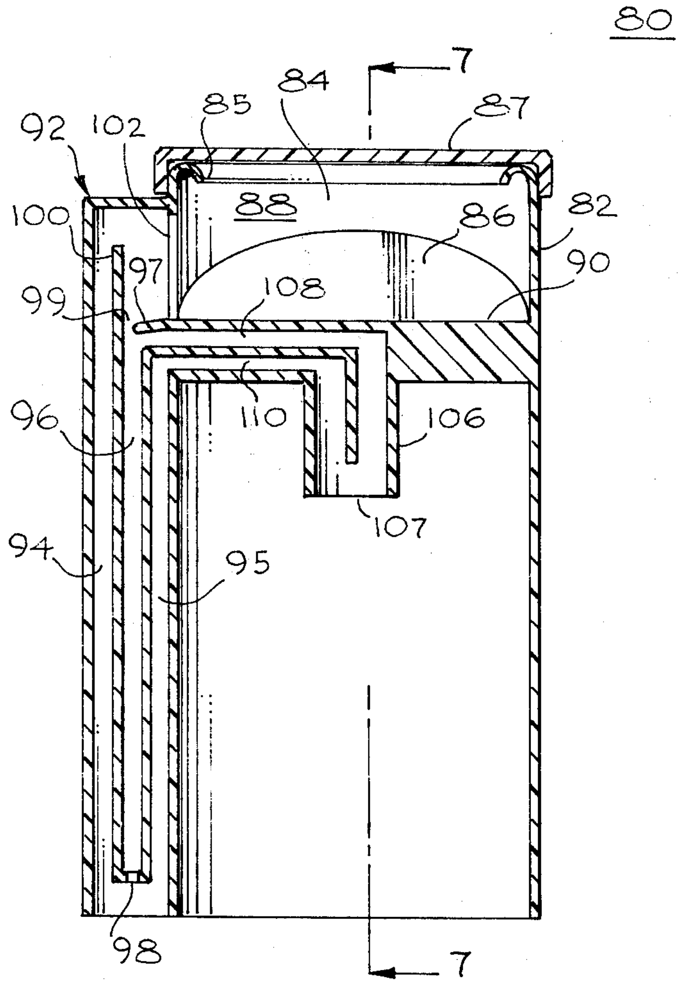
FIG. 5 is an elevational view in section of a second preferred embodiment of the preferred invention.
Figure 7:
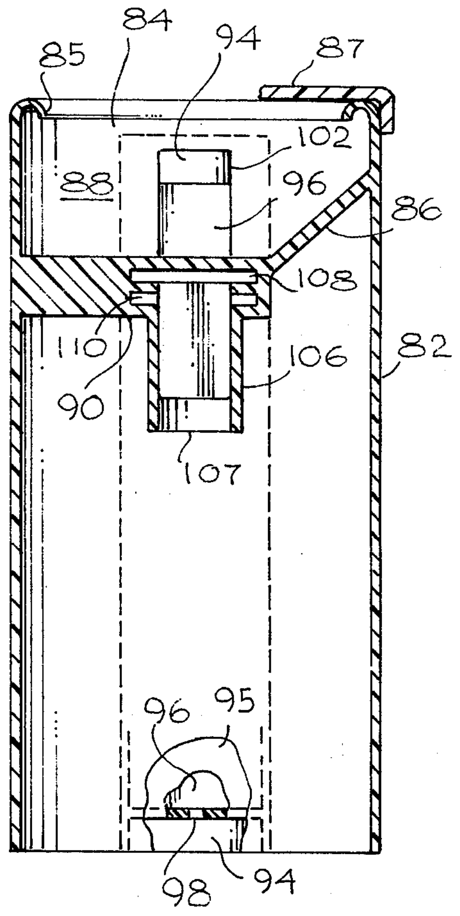
FIG. 7 is a sectional view of the embodiment of FIG. 5, taken along the line 7—7 thereof.
Figure 6:
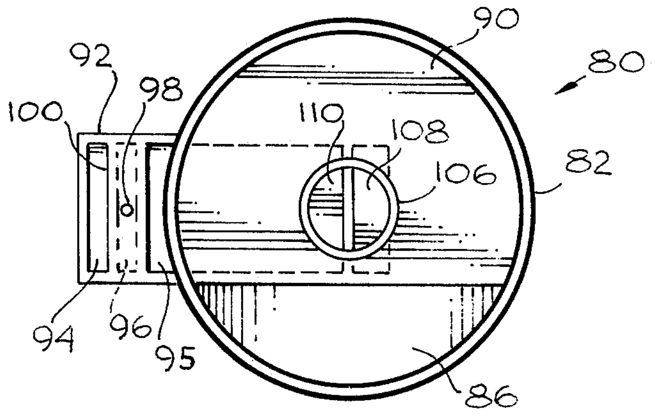
FIG. 6 is a bottom view of the embodient of FIG. 5.

An alternative embodiment may be seen in FIGS. 5–7 of the accompanying drawings. FIG. 5 is a side elevational view, in section, of a collector 80 which has a generally cylindrical wall 82 having an opening 84 in the top portion thereof. The top edge of wall 82 has overhanging lips 85 turned inwardly to aid in collecting the stream. An inclined bottom or floor section 86 is provided to funnel or channel the urine stream. A removable cover 87 is provided to keep the unit sealed in sterile condition until use. A similar closure (not shown) may be provided across the bottom. The inclined floor 86 is a floor of a receiving chamber 88. A level floor 90 is provided adjacent floor 86 in receiving chamber 88 for guiding the urine stream.

An extended section 92 extends beyond the cylindrical periphery of the wall 82. Extended section 92 has run-off channels 94 and 95 opening to the exterior at the bottom of the collector 80. A channel 96 is provided inwardly from the run-off channel 94. The channel 96 may be considered as an extension of the receiving chamber 88, or it may be considered as a second chamber separated therefrom by a partition or lip 97. The channel 96 has a leak hole 98 at the bottom thereof opening also to the exterior of collector 80. Wall 100 separates the run-off channels 94, 95 from the chamber 96. An opening 102 allows the urine to flow out of the receiving chamber 88 and, depending on the volume and rate of the urine flowing therethrough, into the transfer chamber 96 and the run-off channel 94. The partition 97 with opening 99 permits urine to flow into the chamber 96 but limits turbulence therein so as to prevent the sedimentary particles of contamination from the initial voiding from mixing with the midstream portion as it flows through the opening 99 and thence directly through a connecting conduit to the specimen container (not shown).

A nipple 106 is provided extending from the floor 90 into the lower open regions of the collector 80. The cylindrical wall 82 is open at the lower extremity in order to facilitate the insertion of the container, such as container 46 seen in FIG. 4 of the drawings. A conduit 108 connects the upper end of channel 96 with the tip 107 of nipple 106. A separate conduit 110 within nipple 106 connects the tip 107 of nipple 106 with the run-off channel 95.

In FIG. 6, a bottom view of the embodiment of FIG. 5 is seen in which collector 80 is shown as having generally cylindrical wall 82 with a portion 92 extending at one point. Run-off channels 94, 95 are shown opening to the outside. Leak hole 98 bleeds or drains from channel 96 to the exterior of the collector 80. Wall 100 encloses channel 96. Nipple 106 is shown having conduits 110 and 108 extending therein. The inclined floor 86 and flat floor 90 are shown in the bottom view as seen.

In order to further facilitate understanding of the invention, a side elevational view taken along line 7—7 of FIG. 5 is shown in FIG. 7 of the drawings. Collector 80 as seen in FIG. 7 is comprised of cylindrical wall 82 having an opening 84 in the top portion thereof. Inclined floor 86 and floor 90 substantially comprise the floor of the collecting chamber 88. Opening 102 allows the liquid in chamber 88 to flow into the transfer channel 96 and the overflow or run-off channel 94.

Nipple 106 having a tip 107 is shown connected to the floor 90. Conduit 108 connecting the upper end of channel 96 with the tip 107 is shown. Also shown are portions of channel 110 extending through the nipple 106. The bottom or lower portion of cylindrical wall 82 is open to the exterior of the collector 80.

In use, the embodiment shown in FIGS. 5–7 of the drawings is intended to be held with the opening 84 positioned so as to receive a urine stream voided by the user. The stream will enter through the opening 84 into the receiving chamber 88. Inclined bottom 86 will funnel the stream to the floor 90 of the chamber 88. The inclined floor 86 will further dampen the splashing effects, as will the overhanging lips 85 of the openings 84. The urine will first flow from the floor 90 of first chamber 88 into the transfer chamber 96 through the openings 102 and 99. The initial portion of the urine stream flows directly into the chamber 96. Leak hole 98 immediately begins bleeding the initial portion of the stream at a limited rate of flow. The urine level builds up within the chamber 96 until, when the chamber 96 is filled, the urine at the midstream will be bled through conduit 108 to the nipple 106 and associated container (not shown). The container will become filled in the manner described in connection with FIGS. 1-3, air and overflow urine exiting via conduit 110 and run-off channel 95.

If the flow of the urine stream is at such a rate that the volume cannot be accommodated by the first collecting chamber 88 as it is being bled by leak hole 98 and through conduit 108, the urine will build up in the chamber 88 to a level above the floor 90. If the urine builds to a level as high as the top of separating wall 100, the excess urine will run-off through the run-off channel 94.

In such a manner, it may be appreciated that urine at any anticipated rate of flow can be accommodated while a selected portion of the urine in the midstream voiding can be collected. The urine collected from the midstream portion can be removed from the collector 80 by removing the container such as 46 from the nipple 106. Again, the cap 52 may be securely placed over the opening 50 of the container 46, which may now be transported or stored as desired. The collector 80 may be constructed of relatively inexpensive materials so that it may be disposed or discarded after only a single use.

Although there have been described above specific arrangements of a midstream urine specimen collector in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of this invention, as defined by the claims.

What is claimed is:

1. A urine specimen collecting device for collecting a selected specimen from a midstream portion during voiding, comprising:
- a receiving chamber having an opening for receiving the voided urine;
- a transfer chamber communicating with the receiving chamber for accepting urine from the receiving chamber;
- means for diverting and bleeding out of said device a first portion of the urine received in the receiving chamber;
- a conduit extending from the transfer chamber to a coupling for connection to an associated container for transferring the selected midstream portion through the conduit to the container; and
- an overflow passage communicating with the receiving chamber above the diverting means for diverting excess urine above a predetermined level in the receiving chamber to drain out of the device, thereby bypassing the transfer chamber.

2. The device of claim 1 further including a disposable container mounted to the device by a nipple, the nipple comprising said coupling.

3. The device of claim 2 wherein the overflow passage includes run-off channel means communicating with the receiving chamber via an opening at an upper level thereof for channelling out of the device that urine received after the selected midstream portion is transferred.

4. The device of claim 3 further including a second conduit extending from the nipple to the run-off channel means.

5. An integral one-piece formed device for collecting a urine specimen from a selected midstream portion during voiding, comprising:
- a receiving chamber having an opening for receiving voided urine, the receiving chamber including a pocket section for accepting and temporarily holding a first portion of the urine voided into the receiving chamber;
- means communicating with the receiving portion and including a first conduit extending therethrough for coupling to an associated specimen container;
- means for transferring urine above a first predetermined level from said pocket section to said first conduit; and
- an overflow passage communicating with the receiving chamber above the pocket section for diverting excess urine above a second predetermined level in the receiving chamber to drain out of the device, thereby bypassing the pocket section.

6. The device of claim 5 wherein the overflow passage includes run-off channel means communicating with the receiving chamber above a second predetermined level for removing overflow from the receiving chamber.

7. The device of claim 6 further including a specimen container mounted within the device and affixed to the coupling means.

8. The device of claim 7 further including a second conduit extending from the coupling means to the run-off channel means for transferring trapped air and overflow from the container to the run-off channel means.

9. The device of claim 7 further comprising a cylindrical side wall extending downward to below the bottom of the container for providing a base support for the device with the container mounted within said side wall.

10. The device of claim 5 further including means for draining the receiving chamber at a limited rate relative to the anticipated rate of flow into the receiving chamber during midstream voiding.

11. The device of claim 10 wherein said draining means comprises means defining an opening at the bottom of the pocket section.

12. The device of claim 5 further including a partial partition and opening separating the pocket section of the receiving chamber from the remainder of said chamber for limiting turbulence in said pocket section.

13. The device of claim 6 wherein said run-off channel means extends downwardly along a side wall of the device and is open at the bottom with the pocket section of the receiving chamber extending downwardly inside the run-off channel means.

14. The device of claim 13 further including a wall enclosing the pocket section and separating it from the run-off channel means.

15. The device of claim 5 wherein the receiving chamber has an inwardly extending rim about its inlet opening for retaining urine received therein.

16. The device of claim 7 wherein said container comprises a sealed chamber except for an opening adapted for mounting to said coupling means, and further including closure means affixed to the container by a flexible attaching member for capping said opening when the container is removed from the device.

17. The device of claim 16 wherein the container further includes a flexible flap located along the bottom thereof to facilitate removal of the container from the device.

18. The device of claim 9 wherein the side wall of the device is curved inwardly to define a finger trip along at least a selected portion thereof to facilitate the holding of the device in a user's hand in a predetermined orientation.

19. The device of claim 5 further including a partition extending upwardly in the receiving chamber to said first predetermined level for blocking the flow of urine below said level from the receiving chamber pocket section to the transfer means, and a deflector extending over said partition for blocking urine entering the receiving chamber from entering the transfer means directly.

20. The device of claim 19 wherein the transferring means includes a transfer chamber separated from the receiving chamber by said partition and said deflector, the transfer chamber communicating with the pocket section via a space between the partition and the deflector and with said first conduit.

21. The device of claim 6 further including a partition separating the run-off channel means from the receiving chamber and defining a first opening for draining the receiving chamber from the bottom thereof into the run-off channel means at a first limited rate and a second larger opening for transmitting overflow above said second predetermined level into the run-off channel means.

* * * * *